United States Patent
Bauer et al.

[19]

[11] Patent Number: 6,138,136
[45] Date of Patent: Oct. 24, 2000

[54] SIGNAL PROCESSOR

[75] Inventors: Harald Bauer, Nürnberg; Dietmar Lorenz, Erlangen; Peter Meyer, Fürth, all of Germany; Roberto Woudsma, Nuenen, Netherlands

[73] Assignee: U.S. Philips Corporation, New York, N.Y.

[21] Appl. No.: 09/011,673

[22] PCT Filed: Jun. 23, 1997

[86] PCT No.: PCT/IB97/00760

§ 371 Date: Oct. 23, 1998

§ 102(e) Date: Oct. 23, 1998

[87] PCT Pub. No.: WO97/50030

PCT Pub. Date: Dec. 31, 1997

[30] Foreign Application Priority Data

Jun. 26, 1996 [DE] Germany ............................ 196 25 569

[51] Int. Cl.[7] ......................................................... G06F 7/38
[52] U.S. Cl. ............................................. 708/501; 712/35
[58] Field of Search .............................. 314/736; 712/35; 708/500, 501

[56] References Cited

U.S. PATENT DOCUMENTS

| | | | |
|---|---|---|---|
| 4,725,973 | 2/1988 | Matsuura et al. | 364/736 |
| 5,155,852 | 10/1992 | Murakami et al. | 395/725 |
| 5,204,828 | 4/1993 | Kohn | 364/736 |
| 5,388,236 | 2/1995 | Murakami et al. | 395/375 |
| 5,442,580 | 8/1995 | Fettweis | 364/736 |
| 5,799,201 | 8/1998 | Lorenz et al. | 395/800 |

*Primary Examiner*—John A. Follansbee
*Attorney, Agent, or Firm*—Dicran Halajian

[57] ABSTRACT

A signal processor includes at least one data source (3), a plurality of input registers (11, 12, 13, 14, ...) whose inputs are coupled to the data source by data buses (9, 10), a plurality of multipliers (19, 20; 71, 72 ...) for multiplying data buffered in the input registers, and a processing arrangement spread over a plurality of data processor branches (4-0, 4-1, ..., 4-N) for processing products (p0, p1, ...), generated by the multipliers by arithmetic and/or logic operations. For achieving enhanced flexibility of the signal processor and increasing the number of possible applications, multiplexers (15, 16, 17, 18; 70) are provided which are used for coupling the multipliers to a respective part of the input registers in dependence on control signals (I, II, III, IV). Such a signal processor is preferably used in mobile radio technology. Further fields of application are, for example, audio, video, medical and automotive technology, ISDN systems, and digital radio.

12 Claims, 4 Drawing Sheets

SIGNAL PROCESSOR

BACKGROUND OF THE INVENTION

The invention relates to a signal processor comprising
at least one data source,
a plurality of input registers whose inputs are coupled to the data source by data buses,
processing means for processing data buffered in the input registers by arithmetic and/or logic operations which processing means are spread over a plurality of parallel data processor branches.

Signal processors are specific microprocessors having a high computing speed, whose instruction sets and architectures are attuned to specific requirements in the range of digital signal processing and which are particularly used for converting complex algorithms in real time. For example, signal processors are used in the field of mobile radio according to the GSM standard where they are used in mobile radio terminals or radio base stations for converting complex signal processing algorithms. Further fields of application are, for example, audio, video, medical and automotive technology, such as DECT systems (Digital European Cordless Telephone), ISDN systems (Integrated Services Digital Network) or digital radio.

From DE-A 43 44 157, a conterpart of which is U.S. Pat. No. 5,799,201 is known a signal processor of the type defined in the opening paragraph. The signal processor described there comprises a plurality of input registers coupled to a data source by two data buses. Only a first part of the input registers is directly connected to the data buses. Data to be processed are transmitted to the second part of the input registers via the first part of the input registers. In this manner, the data transmitted to the second part of the input registers are delayed. The data applied to the input registers are processed in parallel. They are applied to multipliers whose output values (products) are further processed in parallel by means of arithmetic/logic units (ALU) and accumulator registers.

Such signal processors are suitable for the accelerated computation of autocorrelation and cross-correlation functions. Furthermore, faster digital FIR filters can be realized with such signal processors. However, other algorithms, such as, for example, algorithms for determining the Fast Fourier Transform (FFT) or LTP (Long-Term Prediction) algorithms in the field of speech processing cannot be accelerated with such signal processors, or only to a limited extent.

OBJECTS AND SUMMARY OF THE INVENTION

Therefore, it is an object of the invention to modify the signal processor of the type defined in the opening paragraph, so that enhanced flexibility of the signal processor is achieved and the number of possible applications is increased.

The object is achieved in that multiplexing means are provided which are used for coupling the arithmetic and/or logic-operation processing means of the various data processing branches to a respective part of the input registers in dependence on control signals.

The multiplexing means couple an arbitrary number of input registers, which number can be determined by the control signals, to the arithmetic and/or logic-operation processing means spread over the parallel processing branches. More particularly the data buffered in the input registers are selectively applied to the multipliers arranged in the parallel data processing branches, while the products delivered by the multipliers are further processed by further arithmetic and/or logic-operation processing means. The data source producing the data represents, for example, a memory unit; but also other forms of data sources such as, for example, registers or so-termed I/O ports may be used here. The required enhanced flexibility is established without a loss of processing power, because the allocation between input registers and the arithmetic and/or logic-operation processing means is no longer fixed, but may be predefined by control signals which, in turn, can again be easily adapted to the respective application by means of software. Based on the invention. it is possible to further process, as required, data buffered in an input register in different instruction cycles and different parallel data processing branches, more particularly, by letting various multipliers form different products which have at least partly the same factors, without a renewed data transmission by a data bus being necessary and without delay elements being necessary. On the one hand, as a result of the avoided data transmissions, there is improved use of the data bus system and, on the other hand, as a result of the parallel signal processing possible with this signal processor, there is enhanced processing capacity.

In an embodiment of the invention the arithmetic/logic units have inputs for receiving the products generated by the multipliers, and accumulator registers are provided whose inputs are coupled to outputs of the arithmetic/logic units and whose outputs are coupled to inputs of the arithmetic/logic units by feedback paths. Such an arrangement provides that product sums (scalar products) can be computed inexpensively and fast. In many areas, the computation of product sums requires digital signal processing. Examples thereof are mentioned above.

The invention is furthermore embodied in that the input registers are coupled to the data source by a first and a second data bus, in that two multipliers are provided which can be coupled to two of the input registers via the multiplexing means and in that a first part of the input registers is only coupled to the first data bus and in that a second part of the input registers is coupled both to the first and to the second data bus. Such an arrangement is applied, for example, when autocorrelation functions, cross-correlation functions, FIR (Finite Impulse Response) filtering and in LTP (Long-Tern Prediction) algorithms in the field of speech processing are determined, while sums of products are computed which comprise two factors each.

The invention also relates to a mobile radio terminal and a mobile radio base station including a signal processor according to the invention, which processor is used for the digital signal processing in these applications, for example, for converting speech Processing algorithms, for channel coding/decoding, for the conversion of equalizer functions and/or for processing encryption algorithms. Also signal processing in a radio apparatus for digital radio, an ISDN telephone or a DECT system may advantageously include a signal processor according to the invention.

The invention also relates to a method of parallel digital signal processing in which data from at least one data source are transmitted in parallel to a plurality of input registers by a plurality of data buses, and in which method data buffered in the input registers are selectively transmitted in parallel by multiplexing means to arithmetic and/or logic-operation processing means in dependence on control signals. If data buffered in one of the data registers are used by various multipliers in successive instruction cycles for forming a product, many product sums, for example, like those for computing autocorrelation functions can be computed more efficiently. If a multiplier is used for squaring data of an input register, algorithms such as, for example, LTP algorithms can also be computed more efficiently.

These and other aspects of the invention will be apparent from and elucidated with reference to the embodiments described hereinafter.

DETAILED DESCRIPTION OF THE PREFERRED EMBODIMENT

Figure 1:
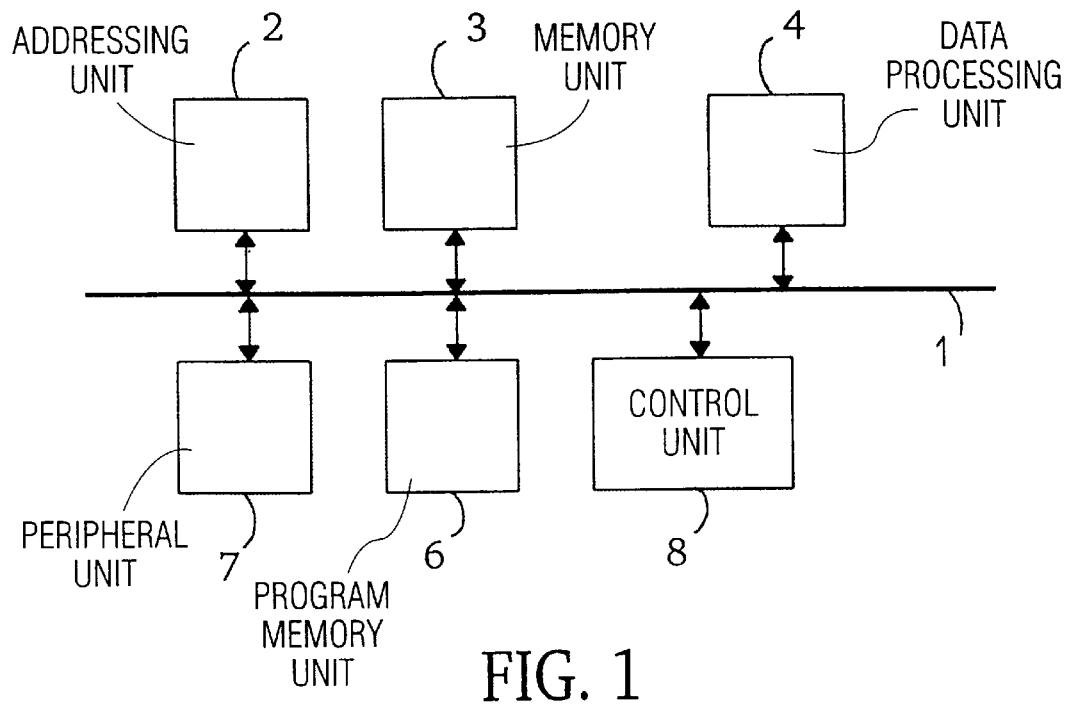
FIG. 1 shows the block circuit diagram of a signal processor.

The signal processor shown in FIG. 1 comprises a bus system by which a plurality of function blocks are coupled. The bus system 1 comprises buses for transmitting data, addresses and control signals. For example, the bus system 1 comprises a data bus system and a program bus which are not represented in detail. An addressing unit 2 supplies addresses to a memory unit 3, so that associated memory contents are read out. The memory unit 3 is generally formed by a ROM and/or a RAM. Furthermore, a data processing unit 4 is provided which is used for processing the data read from the memory unit 3 and which data processing unit comprises a plurality of parallel data processing branches shown in FIGS. 2, 4 and 5. A program memory unit 6 is connected by the program bus to the units connected to the bus system 1.

Furthermore, a peripheral unit 7 is connected to the bus system 1, which peripheral unit comprises input and output units. A control unit 8 is coupled via control lines to the units connected to the bus system 1. The control unit 8 controls the program run and coordinates the access of the units 2 to 7 to the bus system 1.

Figure 2:
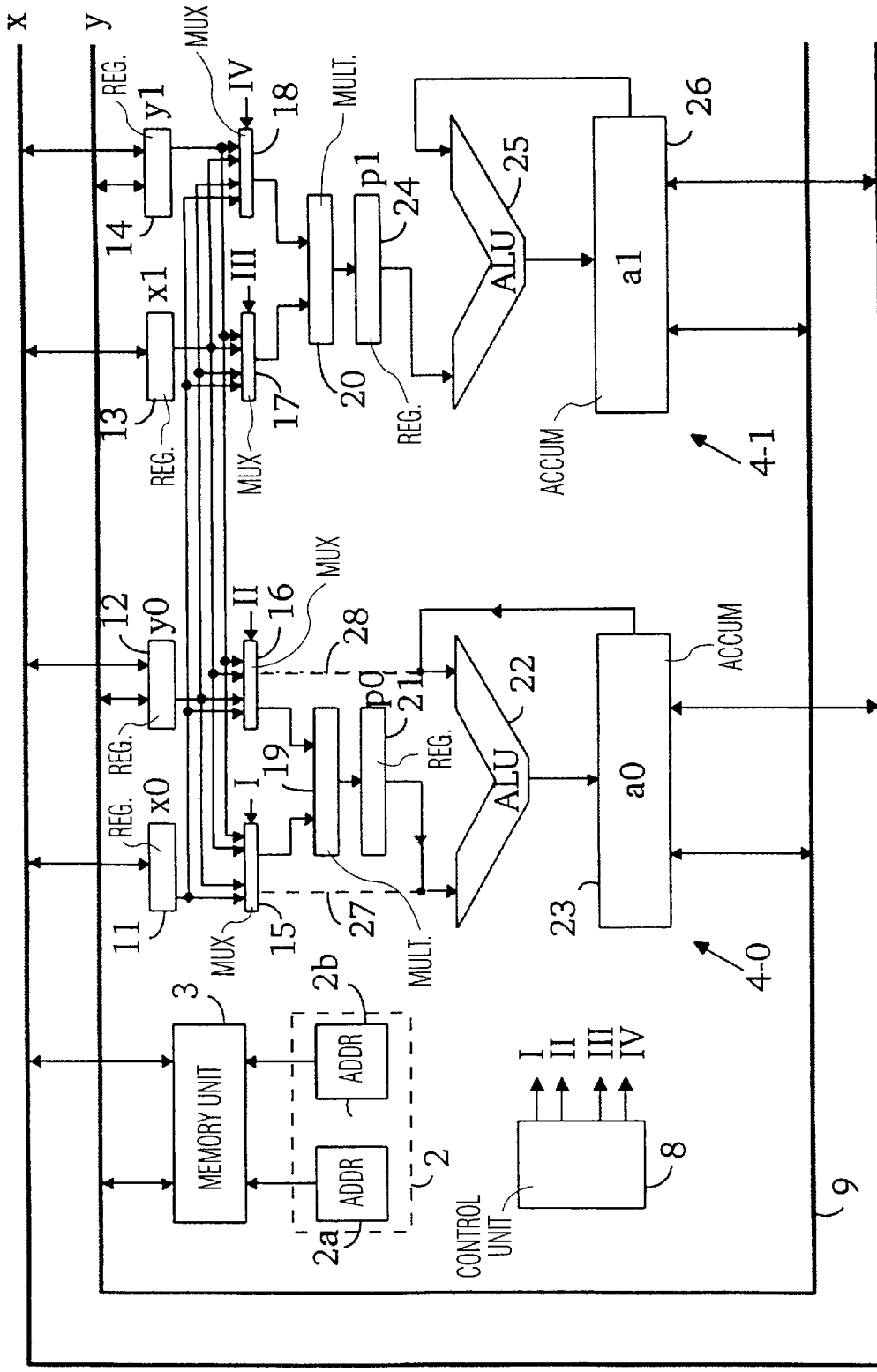
FIG. 2 shows a part of the signal processor shown in FIG. 1.

FIG. 2 shows in more detail part of the signal processor shown in FIG. 1. The memory unit 3 operating as a data source and a data sink is addressed by the addressing unit 2 with addresses generated by two addressing blocks 2a and 2b. The data addressed by the addressing block 2a and stored in the memory unit 3 are transmitted by a first data bus 9 (y data bus). The data addressed by the second addressing block 2b and stored in the memory unit 3 are transmitted by a second data bus 10 (x data bus). In accordance with its function, the addressing unit 2 is connected to the memory unit 3 by address lines. The data buses 9 and 10 form part of the bus system 1 shown in FIG. 1. Instead of the memory unit 3, also other registers of the signal processor or also I/O registers (parts of external interfaces of the signal processor) are considered possible further data sources.

Furthermore, the basic structure of two parallel data processing branches 4-0 and 4-1 of the data processing unit (see FIG. 1) is represented. The data processing branch 4-0 includes two input registers 11 (x0) and 12 (y0). The input register 11 is coupled to the data bus 10, the input register 12 to the data buses 9 and 10. Accordingly, the second data processing branch 4-1 includes two input registers 13 (x1) and 14 (y1), the input register 13 being coupled to the data bus 10 and the input register 14 to the data buses 9 and 10. The input registers 11, 12, 13 and 14 are used, on the one hand, for receiving data transmitted by the data buses 9 and 10. On the other hand, in the event of so-termed interrupts, data buffered in the input registers are transmitted from there by the data buses 9 and 10 to the memory unit 3, stored there in a stack and retransmitted from there to the input registers at a later instant, to be buffered again.

Each processing branch includes two multiplexers. The data processing branch 4-0 includes the multiplexers 15 and 16, the data processing branch 4-1 includes the multiplexers 17 and 18. Each one of the four multiplexers 15 to 18 is coupled to the output of the four input registers 11 to 14. Depending on the control signals I, II, III and IV, the multiplexers 15 to 18 switch one of their four input signals ie the respective data buffered in the input registers 11 to 14 through to the multipliers 19 and 20. Depending on the four switch states to be controlled of the multiplexers 15 to 18, the control signals are 2-bits signals which are preferably transmitted by an appropriate number of parallel control lines (in this case 2), as in the previous embodiment. The control inputs with the control signals I to IV are then provided by the control unit 8 in dependence on a program stored in the program memory unit 6 (see FIG. 1).

The multiplier 19 of the first data processing branch 4-0 is used for multiplying the data supplied thereto by the multiplexers 15 and 16. The data switched by the multiplexer 15 form the first factor, the data switched by the multiplexer 16 form the second factor of the products to be produced by the multiplier 19. These products (p0) are buffered in a register 21 coupled to the output of the multiplier 19. This register is only used for safeguarding an error-free pipeline processing. In sufficiently fast signal processors, in which multiplication and addition of the same data set can be effected in one cycle, such a register is indispensable. The products p0 produced by the multiplier 19 are applied to a first input of an arithmetic/logic unit 22 (ALU) after being buffered in the register 21. The second input of the arithmetic/logic unit 22 is supplied with data (a0) buffered in an accumulator 23. The accumulator is connected to the output of the arithmetic/logic unit 22 and, in consecutive instruction cycles, is overwritten with the data formed by this unit. The accumulator 23 is coupled to the data buses 9 and 10, so that data buffered in accumulator 23 can be transmitted to the memory unit 3.

The second data processing branch 4-1 includes a register 24 coupled to the output of the multiplier 20, an arithmetic/logic unit 25 and an accumulator 26, which are arranged and connected in accordance with the description of the first data processing unit 4-0. Also the data (a1) buffered in the accumulator 26 can be transmitted to the memory unit 3 either by the data bus 9 or the data bus 10.

Additional embodiment options in the data processing branch 4-0 are denoted by dashed lines 27 and 28. The first dashed line 27 denotes the possibility of supplying the first input of the arithmetic/logic unit 22 with data from an input register 1 to 14, instead of products formed by the multiplier 19. The second dashed line 28 denotes that the second input of the arithmetic/logic unit 22 can also be supplied directly with the data of one of the input registers 11 to 14 instead of the data buffered in the accumulator 23 and fed back to this second input. This embodiment option obviously also holds for the second data processing branch 4-1. The arithmetic/logic units 22 and 25 have the function of an adder in the preferred embodiment. Further functions, such as subtraction and other arithmetic and/or logic operations may, however, also be realized.

By means of the following Table it becomes clear which products p0 and p1 can be generated by the multipliers 19 and 20 from the data x0, y0, x1 and y1 buffered in the input registers 11, 12, 13 and 14.

TABLE 1

| Multiplier 19 | Multiplier 20 |
|---|---|
| p0=x0·y0 | p1=x0·y0 |
| p0=x1·y0 | p1=x1·y0 |
| p0=x1·y1 | p1=x1·y1 |
| p0=x0·y1 | p1=x0·y1 |
| p0=x0·x0 | p1=x0·x0 |
| p0=x1·x1 | p1=x1·x1 |
| p0=x1·x0 | p1=x1·x0 |
| p0=y0·y0 | P1=y0·y0 |
| p0=y1·y1 | p1=y1·y1 |
| p0=y1·y0 | p1=y1·y0 |

Said factors a(j) and b(j+i) are stored in the memory unit 3 and transmitted by the data buses 9 and 10 to the input registers 11, 12, 13 and 14 to determine the values c(i). Depending on their destination, the computed values c(i) are transmitted through the two data processing branches 4-0 and 4-1 by the data buses 9 and/or 10 from the accumulators 23 and 26 to the memory unit 3, and stored there. From then on they are available for a further signal processing.

The processes in the represented signal processor structure for the computation of the values c(i) will be explained in the following with reference to a program section for computing the values c(0) and c(1). The programming language "C" was used. In the present example, N is assumed to be an integer. The input register 14 (with data y1) shown in FIG. 2 may be omitted for the application represented here. The arrangement described in FIG. 2 is thus modified in the way that only the registers 11, 12 and 13 are provided as input registers.

```
/****************************/
/* Computation of c[0] and c[1]*/
/****************************/
/*  Initialization */
    py0=&a[0];
    px0=&b[0];
    a0=0;              /* c[0] is accululated in a0 */
    a1=0;              /* c[1] is accululated in a1 */
/*  Filling of the pipeline, instruction cycles: 1, 2 and 3 */
                                                    x0=*px0++;
                                                    x1=*px0++,       y0=*py0++;
                            p0=x0·y0,   p1=x1·y0,   x0=*px0++,       y0=*py0++;
/*  Multiplication and accumulation step, instruction cycles: 4, 5, ..., N+3 */
do N/2 {
    a0+=p0,  a1+=p1,   p0=x1·y0,   p1=x0·y0,   x1=px0++,        y0=*py0++,
    a0+=p0,  a1+=p1,   p0=x1·y0,   p1=x0·y0,   x0=px0++,        y0=*py0++,
}
/*  Storing of the results */
    c[0]=a0;
    c[1]=a1;
```

For FIR (Finite Impulse Response) filtering and for computing autocorrelation and cross-correlation functions, terms of the following type are to be computed:

$$c(i) = \sum_{j=0}^{N-1} a(j) * b(j+i) \text{ for } i = 0, \ldots, M$$

With the digital signal processor structure described above it is possible, as described in the following, to compute two neighboring values c(i) in parallel which leads to an increased computing speed of the signal processor. For example, the value c(0) is formed by adding together the products in the accumulator 23 and the value c(1) by adding top-ether the products in the accumulator 26. The computation of c(0) and c(1) is thus carried out in parallel. Once c(0) and c(1) have been computed, a computation of the values c(2) and c(3) may be carried out in parallel in the next step. Further values c(i) are computed in like fashion until all M values c(i) have been determined.

The four initialization indications shown here imply first of all that the pointers py0 are set to the address of the first factor a(0) of the factors a(i). Accordingly, a pointer px0 is set to the address of the first factor b(0) of the factors b(i). The factors a(i) and b(i) are stored in the memory unit 3. In the third and fourth initialization steps, the two accumulators 23 and 26 are set to the values a0=0 and a1=0, respectively.

In the next three steps, there is a filling of the pipeline, in which the registers 11, 12, 13, 21 and 24 are loaded with first data from the memory unit 3 for a computation of c(0) and c(1). In the first instruction cycle, the factor b(0) is loaded into the register 11 by the data bus 10. In the second instruction cycle, the factor b(1) is loaded into the register 13 by the data bus 10 and the factor a(0) into the register 12 by the data bus 9. The next, third instruction cycle implies that the product p0 (product of the factors b(0) and a(0) buffered in the registers 11 and 12) produced by the multiplier 19 is loaded into the register 21 and that the product p1 (product of the factors b(1) and a(0)) produced by the multiplier 20 is loaded into the register 24. In the same instruction cycle, the factor b(2) from the memory unit 3 is loaded into the register 11 by the data bus 10 and the factor a(1) into the register 12 by the data bus 9.

The next instruction cycles, 4, 5, . . . , N+3, comprise a program loop which includes two instruction cycles which are executed N/2 times. In the first instruction cycle of the program loop, the contents of the register 21 (product p0) are added to the contents of the accumulator 23. The contents of the register 24 (product p1) are added to the contents of the accumulator 26. Subsequently, the two registers 21 and 24 are overwritten with the products from the registers 13 (x1) and 12 (y0), or the registers 11 (x0) and 12 (y0), respectively. Subsequently, a new factor b(i) is loaded into the register 13 by the data bus 10 and so is a new factor a(i) into the register 12.

The second instruction cycle of the program loop comprises first, in accordance with the first instruction cycle of the program loop, an updating of the contents of the accumulators 23 and 26 in that the products p0 and p1 are added together. Then, new products p0 and p1 of which the product factors are formed from the memory contents of the registers 11 and 12 for the product p0 and from the registers 13 and 12 for the product p1, are loaded into the registers 21 and 24. Subsequently, the next factor b(i) is loaded into the register II (x0) and the next factor a(i) is loaded into the register 12 by the data buses 10 and 9, respectively.

Once the program loop has been run through N/2 times, the memory contents a0 of the accumulator 23 correspond to the value c(0) and the memory contents of the accumulator 26 (a1) correspond to the value c(1). These values are stored in the memory unit 3 and may be loaded from there for further signal processing purposes. The further values c(i) are computed in accordance with the method described above. The following, Table 2 is used for explaining the runs during the instruction cycles to determine values c(i) which represent product sums or scalar products, respectively.

buffered in the input registers 11 and 13 are used in two successive instruction cycles for computing different products. For example, the factors buffered in these two input registers are used in successive instruction cycles both by the multiplier 19 to form the product (p0) and by the multiplier 20 to form the product (p1). It is not necessary to load new factors simultaneously into the input registers 11 and 13 in each instruction cycle, but it is sufficient to load new factors alternately into these two input registers by the data bus 10.

Another embodiment of the invention is a so-termed LTP (Long-Term Prediction) algorithm for a pitch lag search for speech coding algorithms. The pitch lag search is used for determining a speaker's instantaneous basic oscillation period. The pitch lag search is used, for example, in speech coding in GSM mobile radio systems.

In line with the LTP algorithm, autocorrelation functions and energy values having the form $$c(L) = \sum_{n=0}^{N-1} y(n) * y(n-L) \text{ for } L_{min} \leq L \leq L_{max}$$

$$g(L) = \sum_{n=0}^{N-1} y^2(n-L) \text{ for } L_{min} \leq L \leq L_{max}$$

can be computed. The formula for determining values c(L) relates to the computation of autocorrelation functions, the formula for determining values g(L) relates to determining energy values. The optimum value for the parameter L (pitch lag) appears when the maximum of the expression $c^2(L)/g(L)$ is determined for various values L in the range between $L_{min}$ and $L_{max}$. This post-processing, however, is unessential to the principle of the invention.

TABLE 2

| Instr cycle | x0 | x1 | y0 | p0 | p1 | a0 | a1 |
|---|---|---|---|---|---|---|---|
| 1 | b(0) | ? | ? | ? | ? | 0 | 0 |
| 2 | b(0) | b(1) | a(0) | ? | ? | 0 | 0 |
| 3 | b(2) | b(1) | a(1) | b(0)•a(0) | b(1)•a(0) | 0 | 0 |
| 4 | b(2) | b(3) | a(2) | b(1)•a(1) | b(2)•a(2) | b(0)•a(0) | b(1)•a(0) |
| 5 | b(4) | b(3) | a(3) | b(2)•a(2) | b(3)•a(2) | $\sum_{j=0}^{1} a(j) \cdot b(j)$ | $\sum_{j=0}^{1} a(j) \cdot b(j+1)$ |
| 6 | b(4) | b(5) | a(4) | b(3)•a(3) | b(4)•a(3) | $\sum_{j=0}^{2} a(j) \cdot b(j)$ | $\sum_{j=0}^{2} a(j) \cdot b(j+1)$ |
| . | . | . | . | . | . | . | . |
| . | . | . | . | . | . | . | . |
| . | . | . | . | . | . | . | . |
| N + 2 | b(N) | b(N + 1) | a(N) | b(N − 1)•a(N1) | b(N)•a(N − 1) | $\sum_{j=0}^{N-2} a(j) \cdot b(j)$ | $\sum_{j=0}^{N-2} a(j) \cdot b(j+1)$ |
| N + 3 | b(N + 2) | b(N + 1) | a(N + 1) | b(N)•a(N) | b(N + 1)•a(N) | $\sum_{j=0}^{N-1} a(j) \cdot b(j)$ | $\sum_{j=0}^{N-1} a(j) \cdot b(j+1)$ |

The contents of the registers 11 (x0), 13 (x1), 12 (y0), 21 (p0), 24 (p1) of the accumulators 23 (a0) and 26 (a1) in the individual instruction cycles become rent from Table 2.

With the aid of the program section explained above and Table 2 it becomes clear that the factors (x0) and (x1)

For the same value of the parameter L. both c(L) and g(L) can be simultaneously computed by the signal processor further explained with reference to FIG. 2. This will become evident from the program section to be described hereafter. Again the programming language "C" was used for the representation. The input registers 13 and 14 are not used.

```
/***************************/
/* Computation of c[L] and g[L]*/
/***************************/
/*   Initialization */
     py0=&y[0];
     px0=&y[-L];
     a0=0;              /* g[L] is accumulated in a0 */
     a1=0;              /* c[L] is accumulated in a1 */
/*   Filling of the pipeline, instruction cycles: 1 and 2 */
                                              x0=*px0++;    y0=*py0++;
                    p0=x0·x0,    p1=x0·y0,    x0=*px0++,    y0=*py0++;
/*   Multiplication and accumulation step, instructin cycles: 3, 4, ..., N+2 */
do N {
     a0+=p0,  a1+=p1,   p0=x0·x0,   p1=x0·y0   x0=*px0++,   y0=*py0++;
}
/*   Storing of the results */
     c[L]=a0:
     c[L]=a1:
```

The four initialization steps discussed here include, on the one hand, the setting of two pointers py0 and px0 to the addresses of the elements y(0) and y(−L) of a field, which contains the values y(i). Furthermore, the accumulators 23 and 26 are set to the values a0=0 and a1=0.

Subsequently, the pipeline is filled in two instruction cycles ie the registers 11, 12. 21 and 24 are loaded with first values (x0, y0, p0, p1). Values x(−L), y(−L), y(2−L), . . . from the storage unit 3 are loaded into the register 11 by the data bus 10. Values y(0), y(1), y(2), from the memory unit 3 are loaded into the input register 12 by the data bus 9. Products formed by the multipliers 19 and 20 are loaded into the registers 21 and 24, while the multiplier 19 forms the square of the value (x0) stored in the register 11. The multiplier 20 forms the product of values (x0, y0) buffered in the input registers 11 and 12. The filling of the pipeline is effected in the program cycles 1 and 2.

The program cycles 3, 4, . . . , N+2 correspond to N times running through a program loop. Each time a program loop is run through, it corresponds to an instruction cycle in which first the product p0 buffered in register 21 is added to the contents a0 of the accumulator 23. At the same time, the contents a1 of the accumulator 26 are updated in that the product p1 buffered in the register 24 is added up. Subsequently, new products p0 and p1 formed by the multipliers 19 and 20 are loaded into the registers 21 and 24, while the product p0 corresponds to the square of the contents x0 of the register 11 and the product p1 corresponds to the product of the values x0 and y0 buffered in the input registers 11 and 12. Subsequently, new values y(n−L), y(n) respectively, are loaded into the input registers 11 and 12.

Once the program loop has been run through N times, the values a0 and a1 present in the accumulators 23 and 26 are transmitted via the data buses 9 and 10 to the memory unit 3 as result values c(L) and g(L), and stored there. The following Table 3 is intended to explain this example. The rows of this Table correspond to the respective instruction cycles to which are assigned the memory contents x0, y0, p0, p1, a0 and a1 of the registers 11, 12. 21 and 24 and of the accumulators 23 and 26.

TABLE 3

| Instr. cycle | x0 | y0 | p0 | p1 | a0 | a1 |
|---|---|---|---|---|---|---|
| 1 | y(−L) | y(0) | ? | ? | 0 | 0 |
| 2 | y(1 − L) | y(1) | y(−L)•y(−L) | y(−L)•y(0) | 0 | 0 |
| 3 | y(2 − L) | y(2) | y(1 − L)•y(1 − L) | y(1 − L)•y(1) | y(−L)•y(−L) | y(−L)•y(0) |
| 4 | y(3 − L) | y(3) | y(2 − L)•y(2 − L) | y(2 − L)•y(2) | $\sum_{j=0}^{1} y(j-L) \cdot y(j-L)$ | $\sum_{j=0}^{1} y(j-L) \cdot y(j)$ |
| 5 | y(4 − L) | y(4) | y(3 − L)•y(3 − L) | y(3 − L)•y(3) | $\sum_{j=0}^{2} y(j-L) \cdot y(j-L)$ | $\sum_{j=0}^{2} y(j-L) \cdot y(j)$ |
| . | . | . | . | . | . | . |
| . | . | . | . | . | . | . |
| N + 2 | y(N + 1 − L) | y(N + 1) | y(N − L•a(N − L) | y(N − L)•a(N) | $\sum_{j=0}^{N-1} y(j-L) \cdot y(j-L)$ | $\sum_{j=0}^{N-1} y(j-L) \cdot y(j)$ |

It will be recognized that the contents x0 of the input register 11 are used both for the formation of the product by the multiplier 19 (p0) and for the formation of the product by the multiplier 20 (p1). The arrangement described in the state of the art mentioned in the opening paragraph is unsuitable for computing values c(L) and g(L) in parallel. The signal processor according to the invention thus makes it possible to provide a more flexible parallel signal processing.

A further advantageous application of the signal processor according to the invention lies in the computation of sums for which squares of values are added together. This corresponds to determining the scalar product of two identical vectors. More particularly, the computation of energy values of signals is carried out with sums like these. A computation of energy is effected according to the formula $$e = \sum_{i=0}^{N-1} x^2(i)$$

If N represents an even number, the computation of the energy e may be effected by computing two partial sums $e_0$ and $e_1$ according to the formula $$e = e_0 + e_1 = \sum_{i=0}^{\frac{N}{2}-1} x^2(i) + \sum_{i=\frac{N}{2}}^{N-1} x^2(i)$$

Figure 4:
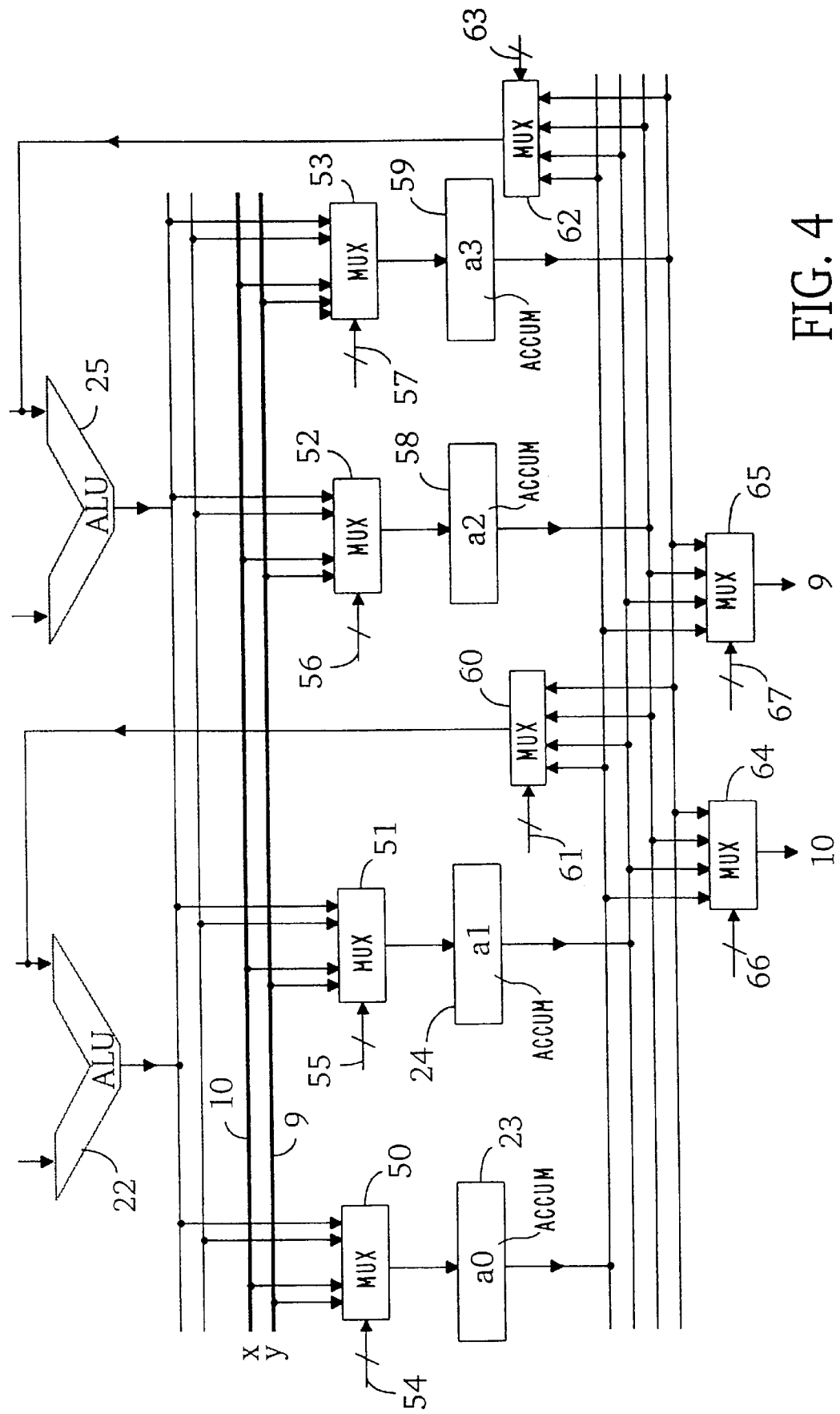
FIG. 4 shows a further aspect of the embodiment shown in FIG. 2.

The two partial sums can be determined simultaneously by processing the signals in parallel in the two data processing branches 4-0 and 4-1 as shown in FIG. 2 in N/2+2 instruction cycles. The program section explained hereafter (programming language "C") explains the computation of energy e via a parallel computation of two partial sums $e_0$ and $e_1$.

carrying out this operation, the signal processor structure of FIG. 2 can be modified to correspond to that of FIG. 4.

Figure 3:
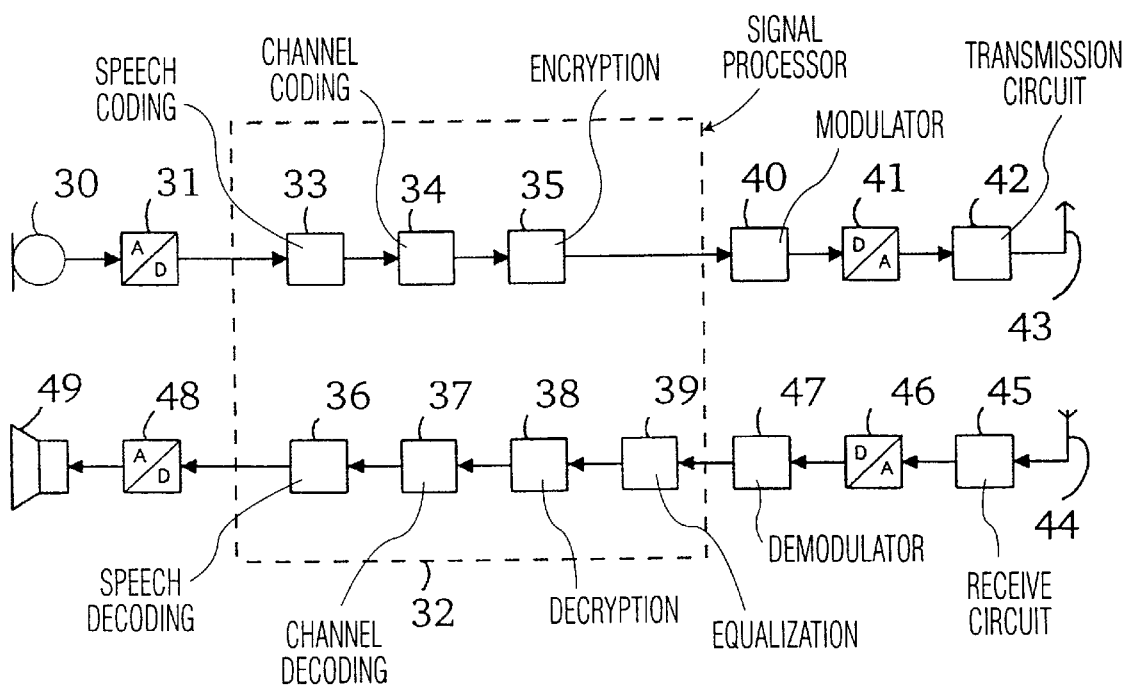
FIG. 3 shows a block diagram of a digital radio telephone including a signal processor shown in FIG. 1 and FIG. 2.

The block diagram shown in FIG. 3 of a digital radio telephone comprises a send and a receive path. The speech signals received from a microphone 30 are converted into binary coded data words in an analog/digital converter 31. These data words are applied to a signal processor 32. For the various functions performed by the signal processor 32, the blocks 33 to 39 are shown in the signal processor 32 in FIG. 3. With the data words generated by the analog/digital converter 31, a speech coding is carried out in block 33 after which, in block 34, a channel coding and, subsequently, an encryption is carried out in block 35. These encrypted data words are GMSK modulated in a modulator 40. This modulator 40 is connected to an output of the signal processor 32. Subsequently, the modulated digital signals are converted into analog modulated signals in a digital/analog converter 41. These modulated analog signals are applied to a transmission circuit 42 which generates radio signals transmitted by an antenna 43. The path described thus far represents the send path of the digital radio telephone.

The receive path of the digital radio telephone will be described in the following. Analog radio signals received from an antenna 44 are processed in a receive circuit 45 and analog modulated signals are applied to an analog/digital converter 46. The digitally modulated signals produced by the analog/digital converter are demodulated in a demodulator 47 and applied to the signal processor 32. The block 39 in the signal processor 32 is to show the subsequent equalization of the modulated signals. Then a decryption function is performed, symbolized by block 38. After a channel decoding in block 37 and a speech decoding in block 36, the signal processor 32 applies digital data words to a digital/analog converter 48 which passes the analog speech signals on to a loudspeaker 49.

The signal processor 32 is not only applicable as a radio telephone in a mobile station of a mobile radio system, but also in a base station of such a system. The signal processor structure explained in FIG. 2 is further not restricted to

```
/***************************/
   /* Computation of e0 and e1 */
/***************************/
/*   Initialization */
     px0=&x[0];
     py0=&x[N/2];
     a0=0;              /* e0 is accumulated in a0 */
     a1=1;              /* e1 is accumulated in a1 */
/*   Filling of the pipeline, instruction cycles: 1 and 2 */
                                         x0=*px0++;     y0p32 *py0++;
                  p0=x0·x0,    p1=y0·y0,  x0=*px0++,    y0=*py0++;
/*   Multiplication and accumulation step, instruction cycles: 3, 4, ..., N/2+2 */
d N {
     a0+=p0,  a1+=p1,  p0=x0·x0,  p1=y0·y0,  x0=*px0++,  u0=*py0++;
}
     /*   Addition of the partial sums e1 and e2, instruction cycles N/2+3*/
            a0+=a1    /*e=e1+e2*/
/*   Storing of the results */
     e=a0;
```

Only the input registers 11 and 12 are used for the computation. The input registers 13 and 14 are not used. In this example, the multiplier 19 forms products p0 which correspond to the square of the respective contents x0 of the input register 11. The multiplier 20 accordingly forms squares from the values y0 buffered in the input register 12.

In this example, the memory contents of the accumulators 23 and 26 are finally added together to determine the respective energy from the two partial sums $e_1$ and $e_2$. For signal processors. For example, the structure may also be realized in microcomputers or chips respectively, specifically developed for radio equipment of a mobile radio system (mobile and base stations). The processor structure according to the invention may further also be used, for example, in DECT systems, ISDN telephones or radio equipment for digital radio.

In the signal processor structure shown in FIG. 4 are provided multiplexers 50, 51, 52 and 53. In dependence on control signals produced by the control unit 8 (see FIG. 1)

and supplied to these multiplexers through control inputs 54, 55, 56 and 57, these multiplexers either couple one of the outputs of the arithmetic/logic units 22 and 25, or the data bus 9 or to the accumulators 23 and 24 and two further accumulators 58 and 59. The output of the multiplexer 50 is then coupled to the accumulator 23, the output of the multiplexer 51 to the accumulator 24, the output of the multiplexer 52 to the accumulator 58 and the output of the multiplexer 53 to the accumulator 59. In dependence on control signals applied to the multiplexer 60 through a control input 61 by the control unit 8, one of the outputs of the accumulators 23, 24, 58 and 59 is fed back to one of the inputs of the arithmetic/logic unit 22 similarly to the feedback in FIG. 2. In dependence on control signals transmitted by the control unit 8 to a multiplexer 62 through a control input 63, one of the outputs of the accumulators 23, 24, 58, 59 is coupled to an input of the arithmetic/logic unit 25 via the multiplexer 62, similarly to the procedure with multiplexer 60. The feedback to inputs of the arithmetic/logic units 22 and 25 shown in FIG. 2 is thus increased in such a way that an accumulator is not fixedly assigned to an arithmetic/logic unit, but that the assignment between arithmetic/logic units and accumulators is variable.

Additionally, the data buses 9 and 10 may also be coupled to the accumulators 23, 24, 58 and 59 via the multiplexers 50, 51, 52 and 53. When the accumulators form the sums, also summands can be directly fetched from the memory unit 3 by means of said multiplexers and transferred to the accumulators 23, 24, 58 and 59 and taken into account when a sum is formed. Values stored in the accumulators are applied to the data buses 10 and 9 via multiplexers 64 and 65 to be transmitted to the memory unit 3 and be stored there.

The multiplexers 64 also have control inputs referenced 66 and 67 through which the respective control signals from the control unit 8 are applied to these two multiplexers. In dependence on these control signals, the data buses 10 and 9 are coupled to respective accumulator outputs.

The control signals applied to the multiplexers 50, 51, 52, 53, 60, 62, 64 and 65 are 2-bits signals which make it possible to control the multiplexers in one of their possible four switch states.

With such an arrangement it is possible to add the two partial sums $e_0$ and $e_1$ together in the computation of the energy described above, by feeding back the output of the accumulator 24 via the multiplexer 60 to the respective input of the logarithmic/logic unit 22, and thus by adding the two partial sums to the memory contents a0 of the accumulator 23. With the described arrangement shown in FIG. 4, however, many other combinations of contents of the accumulators 23, 24, 58 and 59 may be provided, while data stored in the memory unit 3 can also be taken into account.

Figure 5:
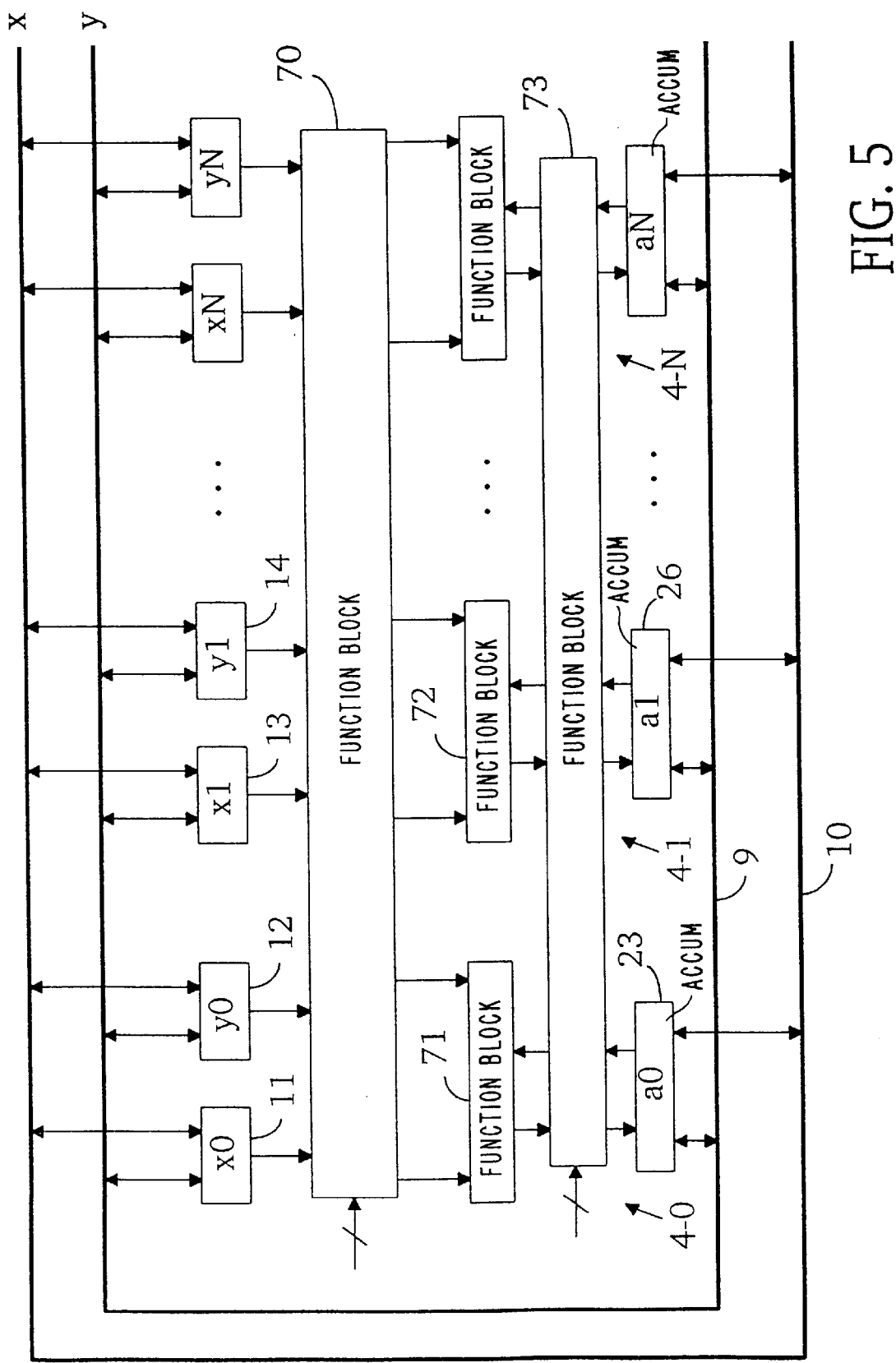
FIG. 5 shows a basic structure of a signal processor according to the invention having N+1 parallel branches.

FIG. 5 shows a generalization of the invention to N+1 parallel data processing branches 4-0, 4-1, . . . , 4-N. The first two data processing branches are the data processing branches 4-0 and 4-1 of FIG. 2 and FIG. 4, respectively. Further N−1 data processing branches are connected in parallel. The input registers of the data processing branches are all coupled to both data bus 9 and data bus 10. However, it is also possible to apply a limitation, in that a part of the input registers is coupled to only one of the data buses. The multiplexers 15, 16, 17 and 18 of the first two data processing branches 4-0 and 4-1, and the respective multiplexers of the further N−1 data processing branches, are combined to a function block 70. A function block 71 comprises the multiplier 19, the register 21 and the arithmetic/logic unit 22 of the first data processing branch 4-0. Accordingly, a function block 72 comprises the multiplier 20, the register 24 and the arithmetic/logic unit 25 of the second data processing branch 4-1. The respective multipliers, registers and arithmetic/logic units of the further data processing branches 4-2, 4-3, . . . , 4-N are combined accordingly. In dependence on control signals, the input registers may optionally be coupled to one or more inputs of said multipliers via the combined multiplexing means in function block 70. A function block 73 combines the multiplexers 50, 51, 52, 53 and 60 and 62 of the first two data processing branches 4-0 and 4-1 shown in FIG. 4 and respective multiplexers of further data processing branches and feedback paths from the accumulators of the data processing branches to inputs of the arithmetic/logic units of the data processing branches. In dependence on control signals produced by the control unit 8, it is thus possible to couple the outputs of the arithmetic/logic units or also the data buses 9 and 10 optionally to one or more inputs of the accumulators (a0, a1, . . . , aN). In dependence on control signals, it is also possible to establish feedback paths from the accumulators to the arithmetic/logic units. The signal processor structure shown in FIG. 5 may, however, be arranged so that the arithmetic/logic units and the accumulators of the individual data processing branches follow the signal processor structure shown in FIG. 2.

The invention may obviously also be extended to more than two data buses. However, this is not shown for clarity. More particularly in the field of video signal processing, for example, when two-dimensional fast Fourier transforms are to be carried out, an extension to more than two data buses will be useful.

Another example for explaining the generalization as shown in FIG. 5 will be explained below, in which values c(i) can be computed according to the formula $$c(i) = \sum_{j=0}^{N-1} a(j) * b(j+i) \text{ for } i = 0, \ldots, M-1$$

These values c(i) may be output values of a FIR filter, of an autocorrelation or cross-correlation. In this example, two data buses 9 and 10 are used as in previous examples. Furthermore, three multipliers are necessary, three input registers (x0, x1, x2) coupled to the data bus 10, one input register (y0) coupled to the data bus 9 and three accumulator registers (a0, a1, a2) and thus three data processing branches 4-0, 4-1 and 4-2. With such a configuration, three terms for the values c(i) can be computed simultaneously in N+4 instruction cycles. The computation will now be explained with reference to a further program section (programnming language "C").

```
/********************************/
/* Computation of c[0], c[1] and c[1]*/
/********************************/

/*    Initialization */
      py0=&a[0];
      px0=&b[0];
```

-continued

```
/********************************/
/* Computation of c[0], c[1] and c[1]*/
/********************************/ a0=0;              /* c[0] is accumulated in a0 */
    a1=0;              /* c[1] is accumulated in a1 */
    a2=0;              /* c[2] is accumulated in a2 */
/*  Filling of the pipeline, instruction cycles 1, 2, 3 and 4 */
                                                            x0=*px0++;
                                                            x1=*px0++,
                                                            x2=*px0++,   y0=*py0++;
                            p0=x0·y0,  p1=x1·y0,  p2=x2·y0, x0=*px0++,   y0=*py0++;
/*Multiplication and accumulation step, instruction cycles: 5, 4, ..., N+4 */
do N/3 {
a0+=p0, a1+=p1, a2+=p2, p0=x1·y0, p1=x2·y0, p2=x0·y0, x1=*px0++, y0=*py0++;
a0+=p0, a1+=p1, a2+=p2, p0=x2·y0, p1=x0·y0, p2=x1·y0, x2=*px0++, y0=*py0++;
a0+=p0, a1+=p1, a2+=p2, p0=x0·y0, p1=x1·y0, p2=x2·y0, x0=*px0++, y0=*py0++;
}
/*Storing of the results */
c[0]=a0;
c[1]=a1;
c[2]=a2;
```

The products formed by the three multipliers are referenced p0, p1, and p2, respectively. To a person of ordinary skill in the art, the routines according to this program section shown here will be apparent from this context and will not be further explained.

In lieu of the multipliers mentioned in the embodiments, to which multipliers data buffered in the input registers are applied selectively, it is also possible to use adders and/or subtracters. Furthermore, variations with respect to the function of the arithmetic/logic units (ALU) are possible. It is particularly advantageous to use the arithmetic/logic units for forming the products. With the aid of such arrangements it is then possible to rapidly determine coefficients having the form $$c(i) = \sum_j (a(j) \pm b(j+i))^2$$

(for example, for computing the distance in the domain of speech processing), or coefficients having the form $$c(j) = \prod_j (a(j) \pm b(j+i))$$

What is claimed is:

1. A signal processor comprising:
   at least one data source,
   at least four input registers having inputs coupled to the data source by a first data bus and a second data bus, wherein a first set of the at least four input registers is coupled only to the first data bus and a second set of the at least four input registers is coupled both to the first second data bus and to the second data bus,
   processing means for processing data buffered in the at least four input registers by arithmetic and/or logic operations, said processing means being spread over a plurality of parallel data processing branches, and
   multiplexing means for selectively coupling the plurality of parallel data processing branches to respective outputs of the at least four input registers in dependence on control signals.

2. The signal processor as claimed in claim 1, wherein the processing means comprises a plurality of multipliers spread over the plurality of parallel data processing branches for multiplying data buffered in the at least three input registers.

3. The signal processor as claimed in claim 2, wherein the processing means further comprises arithmetic and/or logic units which have inputs for receiving products generated by the plurality of multipliers, and accumulator registers having inputs coupled to outputs of the arithmetic and/or logic units and having outputs coupled to inputs of the arithmetic and/or logic units by feedback paths.

4. The signal processor as claimed in claim 1, wherein the processing means comprises at least two multipliers in different ones of the Plurality of parallel data processing branches which can be coupled via the multiplexing means to two of the at least four input registers each.

5. A mobile radio terminal comprising the signal processor as claimed in claim 1 for digital signal processing.

6. A mobile radio base station comprising the signal processor as claimed in claim 1 for digital signal processing.

7. A radio apparatus for digital radio comprising the signal processor as claimed in claim 1 for digital signal processing.

8. An ISDN telephone comprising the signal processor as claimed in claim 1 for digital signal processing.

9. A DECT system comprising the signal processor as claimed in claim 1 for digital signal processing.

10. A method for parallel digital signal processing, comprising transmitting data in parallel from at least one data source to at least four input registers by a first data bus and a second data bus, wherein a first set of the at least four input registers is coupled only to the first data bus and a second set of the at least four input registers is coupled both to the first second data bus and to the second data bus, and selectively transmitting data buffered in the at least four input registers in parallel via multiplexing means to respective parallel data processing branches of arithmetic and/or logic-operation processing means in dependence on control signals to the multiplexing means.

11. The method as claimed in claim 10, wherein data buffered in one of the at least four input registers is used for forming products by a plurality of multipliers in successive instruction cycles.

12. The method as claimed in claim 11, wherein at least one of the plurality of multipliers is used for squaring data of one of said at least four input registers.

* * * * *